United States Patent
Merchant et al.

(10) Patent No.: US 6,535,489 B1
(45) Date of Patent: Mar. 18, 2003

(54) METHOD AND APPARATUS IN A NETWORK SWITCH FOR HANDLING LINK FAILURE AND LINK RECOVERY IN A TRUNKED DATA PATH

(75) Inventors: Shashank Merchant, Sunnyvale, CA (US); Robert Williams, Cupertino, CA (US); John M. Chiang, San Jose, CA (US); Ching Yu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/315,854

(22) Filed: May 21, 1999

(51) Int. Cl.[7] .................................................. G06F 11/10
(52) U.S. Cl. ........................................ 370/244; 370/218
(58) Field of Search ................................ 370/217, 218, 370/225, 389, 391, 469, 244

(56) References Cited

U.S. PATENT DOCUMENTS

| | | | |
|---|---|---|---|
| 5,515,376 A | | 5/1996 | Murthy et al. |
| 5,838,681 A | * | 11/1998 | Bonomi et al. .............. 370/395 |
| 6,236,643 B1 | * | 5/2001 | Kerstein ..................... 370/254 |
| 6,363,077 B1 | * | 3/2002 | Wong et al. ................ 370/422 |
| 6,393,021 B1 | * | 5/2002 | Chow et al. ................ 370/378 |

OTHER PUBLICATIONS

Meir Herzberg, "A Decomposition Approach to Assign Spare Channels in Self–Healing Networks", IEEE 1993, pp. 1601–1605.*

* cited by examiner

*Primary Examiner*—Hassan Kizou
*Assistant Examiner*—Thai Hoang

(57) ABSTRACT

A network switch configured for switching data packets across multiple ports and for supporting trunked data paths uses an address table to generate frame forwarding information. When a link in a trunked data path experiences a change in its operating status, the trunk data path is reconfigured to reflect the current operating conditions, without reprogramming the address table or powering down the switch.

19 Claims, 16 Drawing Sheets

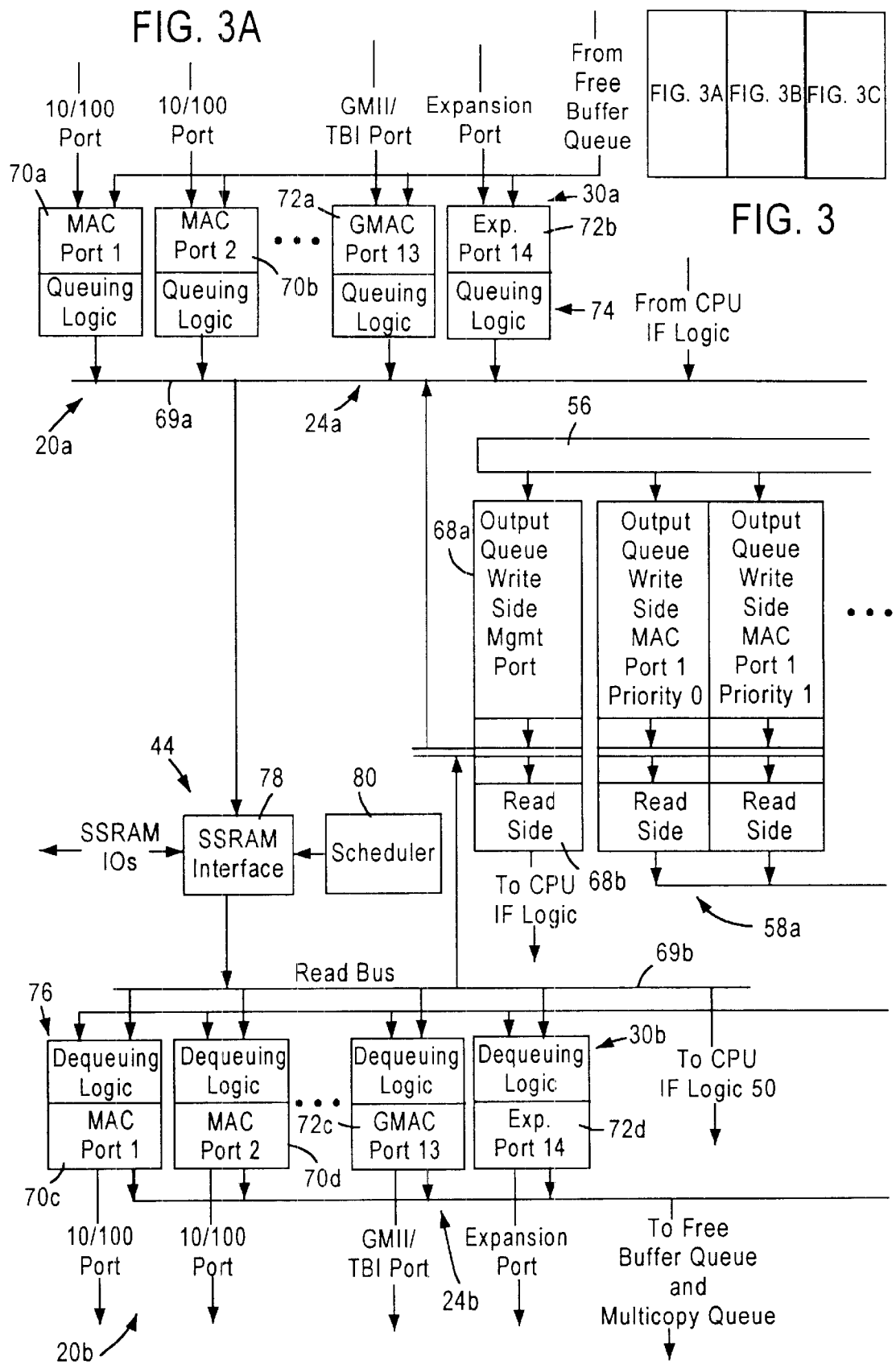

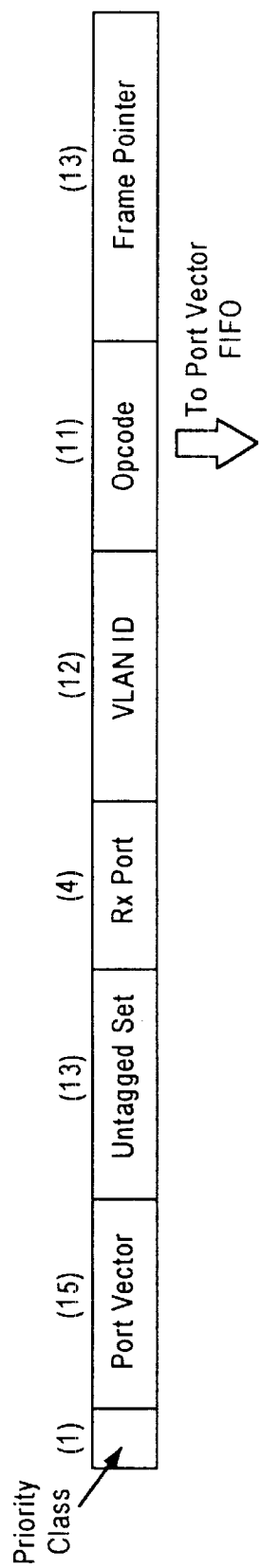

METHOD AND APPARATUS IN A NETWORK SWITCH FOR HANDLING LINK FAILURE AND LINK RECOVERY IN A TRUNKED DATA PATH

CROSS-REFERENCE TO RELATED APPLICATION

This application is related to the following commonly-assigned, copending application Ser. No. PCT/US99/29118, entitled: METHOD AND APPARATUS FOR TRUNKING MULTIPLE PORTS IN A NETWORK SWITCH.

TECHNICAL FIELD

The present invention relates to network communications and more particularly, to handling link failure and link recovery in a trunked data path.

BACKGROUND ART

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path. Typically, the switch controls the communication of data packets on the network.

The network switch includes switching logic for receiving and forwarding frames to the appropriate destinations. One arrangement for generating a frame forwarding decision uses a direct addressing scheme, where the network switch includes a fixed address table storing switching logic for the destination addresses.

For example, a frame may be received by the network switch with header information indicating the source address and destination address of the frame. The switching logic accesses the fixed address table using the source address and destination address as lookups to find the appropriate frame forwarding information. The switch then uses this information and sends the frame to the appropriate port(s).

When all of the stations connected to the network are simultaneously operating, packet traffic on the shared serial path can be heavy with little time between packets. Additionally, due to increased network throughput requirements, increasing the speed with which data is transmitted to its destination is crucial to the overall operation of the switch.

One arrangement for increasing the speed with which data is transmitted between stations uses "trunking", also referred to as link aggregation, to combine a number of links to form a trunk between two stations. For example, suppose two individual ports on the switch are each configured to support 100 Mb/s data transmission rates. The trunking scheme links the two ports together and transmits/receives data via these two ports, resulting in one 200 Mb/s link between the two stations.

A drawback with such a trunking scheme is that the address table must store the appropriate trunking information including the particular trunk port through which to transmit the data. That is, the address table must store information indicating whether a particular port is part of a trunk, in addition to storing information indicating which port of the trunk to transmit the data through when the data forwarding information indicates that the output port is part of a trunk. Storing this trunking information in the address table significantly increases the physical size of the address table and also significantly increases the complexity of the switching logic, thereby increasing the time spent searching for the frame forwarding information.

Additionally, when changes to the stored trunking information are required, e.g., when one or more links in a trunk fails, the address table must be correspondingly changed to ensure that the switch does not attempt to transmit data via a failed link. Alternatively, when a failed-link in a trunk returns to proper working condition, the address table must be changed to reflect that the restored link is part of the trunk once again. This process of reconfiguring the address table is time-consuming and costly, potentially resulting in network downtime.

SUMMARY OF THE INVENTION

There exists a need for a switching device that supports trunking and is able to handle a link failure without reprogramming an address table.

There is also a need for a switching device that enables trunk changes to be made after a link recovery occurs without reprogramming an address table.

These and other needs are met by the present invention, where a multiport switch is configured to support trunking. When a link in a trunked data path experiences a change in its operating status, the trunk data path is reconfigured to reflect the current operating conditions, without requiring reprogramming of an address table.

According to one aspect of the invention, a network switch is configured for controlling the communication of data frames between stations and to support trunking. The switch includes a memory device configured to store trunking information associated with ports on the multiport switch with a plurality of ports comprising active ports of a first trunk based on the trunking information. The data transmission capability from the plurality of ports in the first trunk is set based on a link status associated with each of the plurality of ports.

Another aspect of the present invention provides a method for handling changes in a trunked data path in a multiport switch that controls communication of data frames between stations and is configured to support trunking. The method includes receiving a data frame and generating data forwarding information for the data frame. The method also includes monitoring link status associated with the respective ports on the multiport switch wherein a plurality of ports comprise active ports of a first trunk. The method further includes setting data transmission capability from the plurality of ports in the first trunk based on the link status associated with each of the ports in the first trunk.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

FIG. 9 illustrates the composition of the forwarding descriptor in accordance with an embodiment of the present invention.

FIG. 10 illustrates trunk membership combinations according to an embodiment of the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
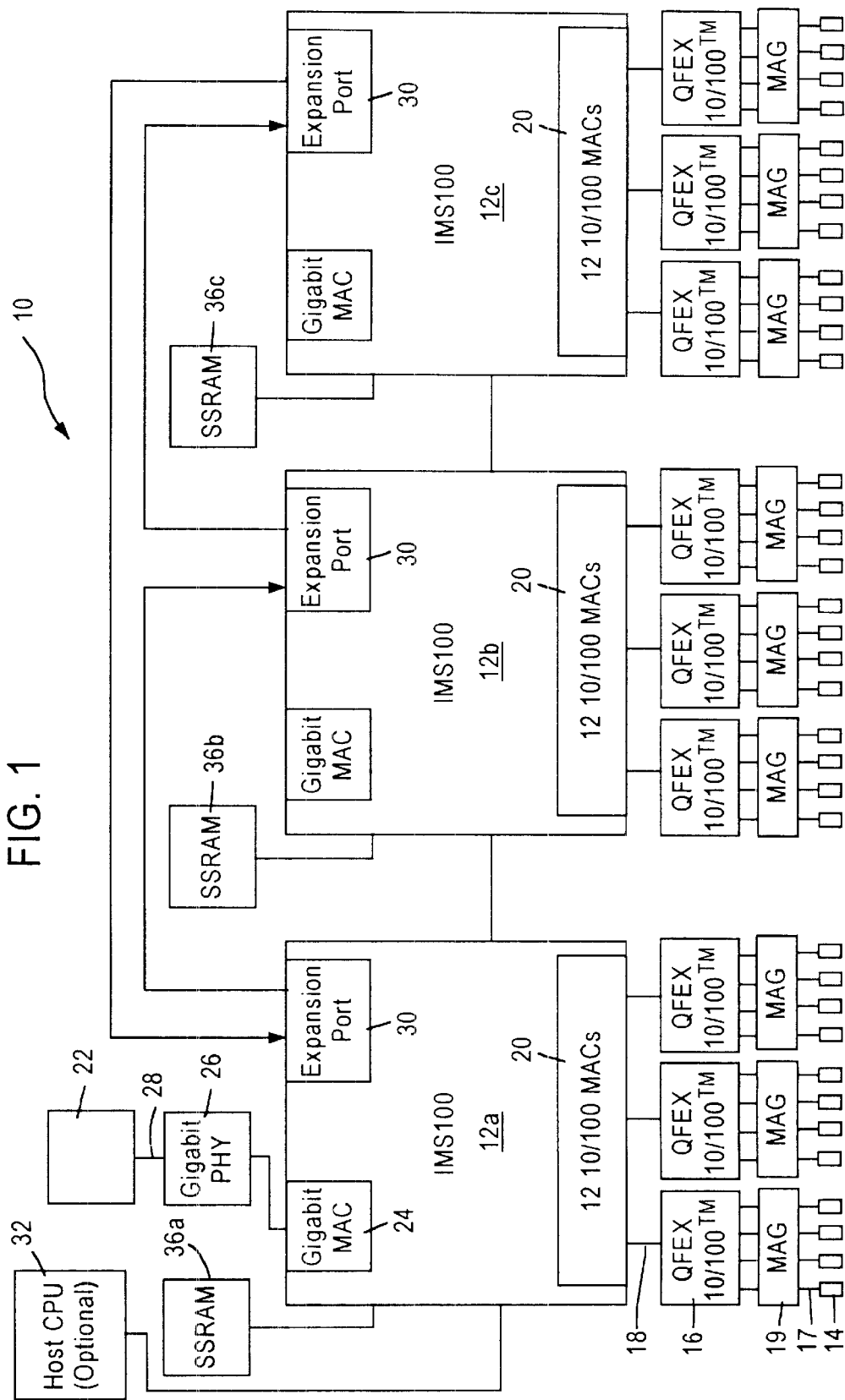
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
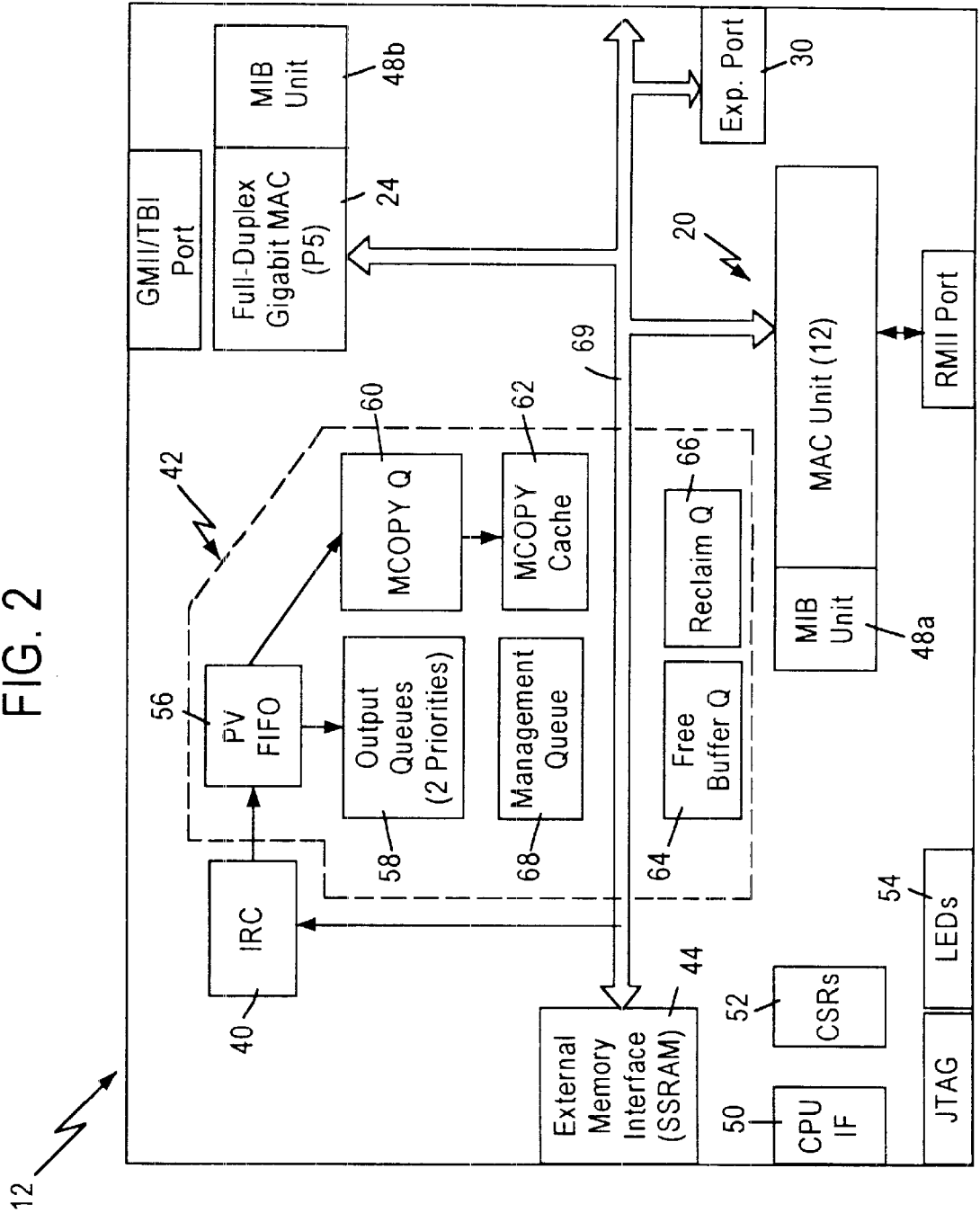
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules. checker (IRC), makes frame forwarding decisions for data packets received.

The multiport switch 12 also includes an LED. interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 9. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
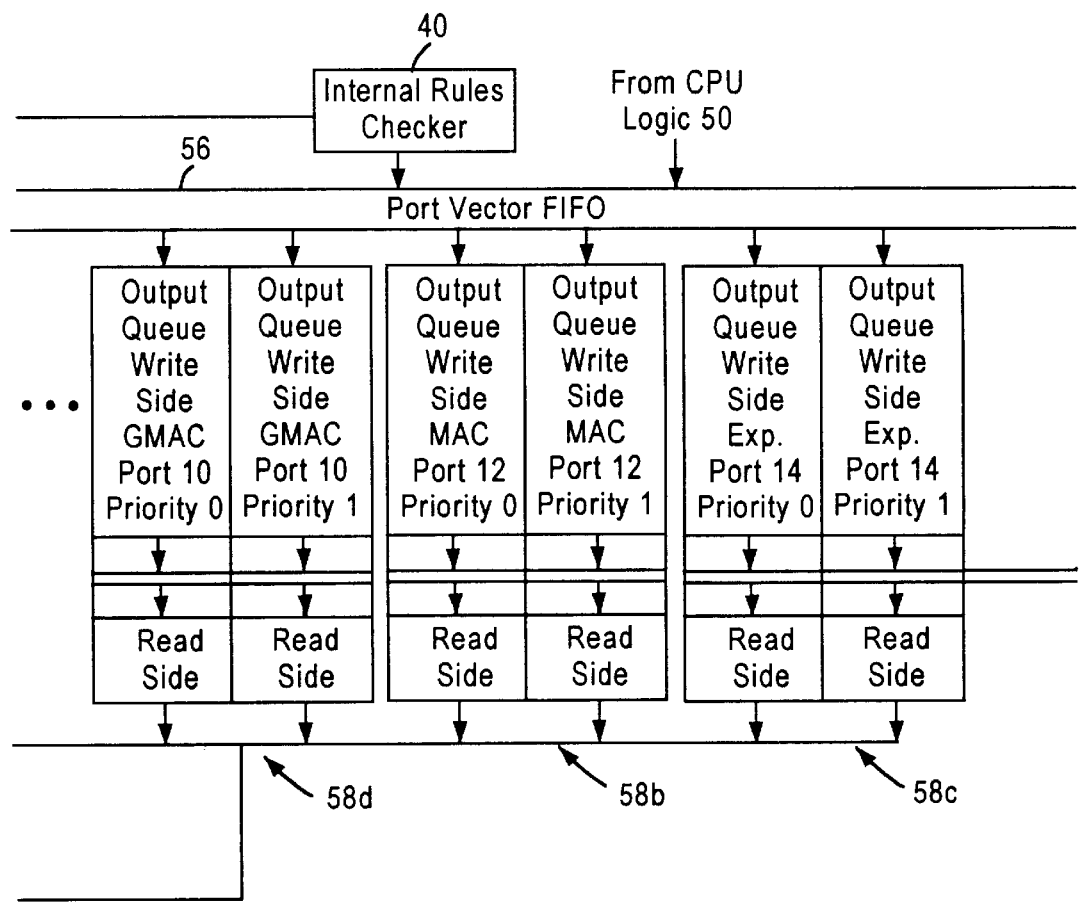
FIG. 3 is a detailed block diagram illustrating the switching subsystem of FIG. 2.
Figure 3C:
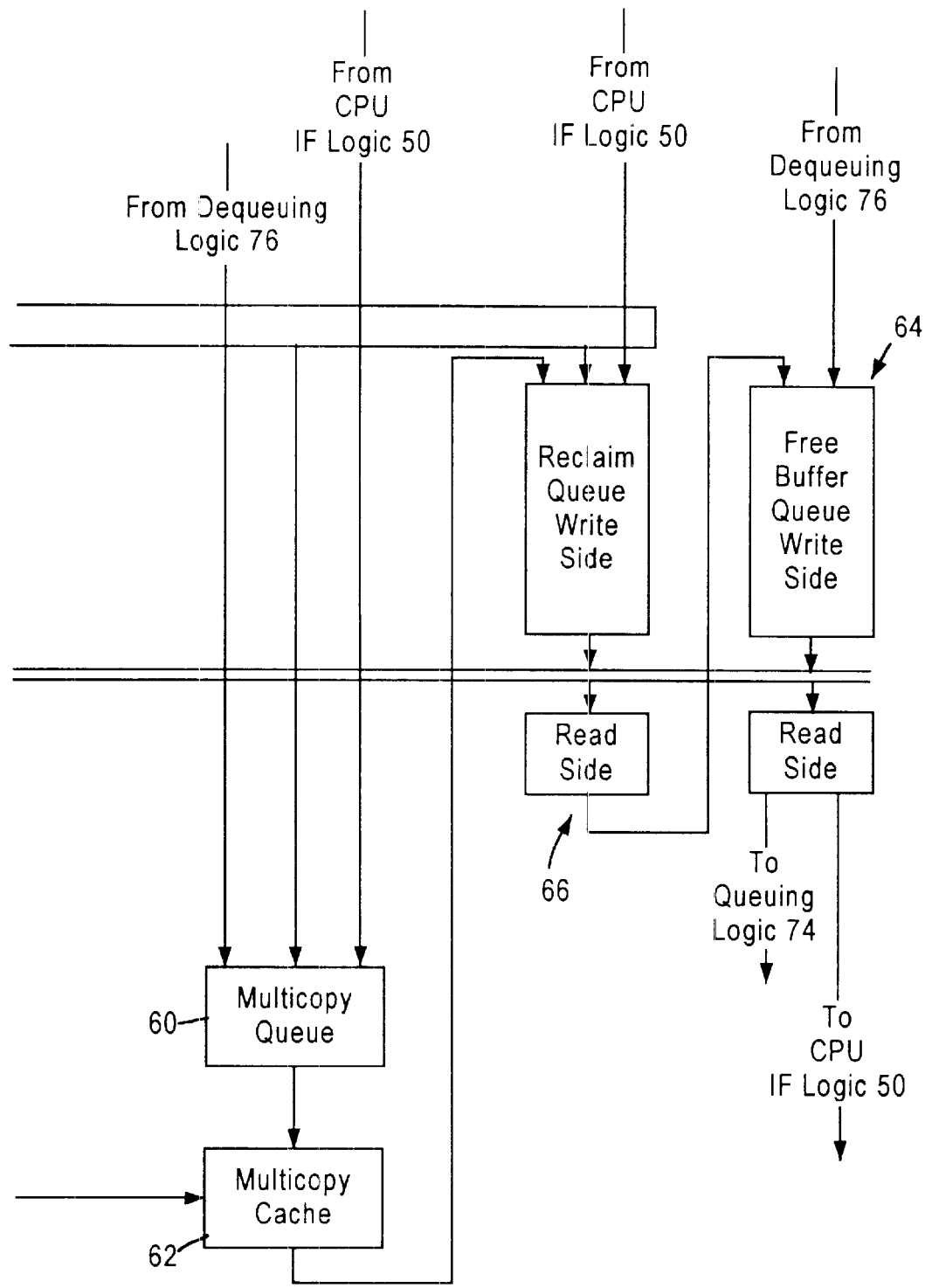

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 are described below.

Internal Rules Checker

The present invention is directed to providing a trunking function in a network switch and more particularly to handling link failure and link recovery in a trunked data path. A description will first be given of the IRC 40, followed by them detailed description of trunking and the method and apparatus for handling link failure and link recovery in a trunked data path.

As described previously, the switch subsystem 42 provides the switching logic for receiving and forwarding frames to the appropriate output ports. The forwarding decisions, however, are made by the IRC 40 located on the multiport switch 12. According to an embodiment of the invention illustrated in FIG. 4, the IRC 40 includes four functional logic blocks, an ingress rules engine 200, a source address (SA) lookup engine 210, a destination address (DA) lookup engine 220 and an egress rules engine 230. In the exemplary embodiment the four engines 200, 210, 220 and 230 are shown as separate logic devices. However, in alternative configurations, these engines may be combined into a single logic device.

Figure 4:
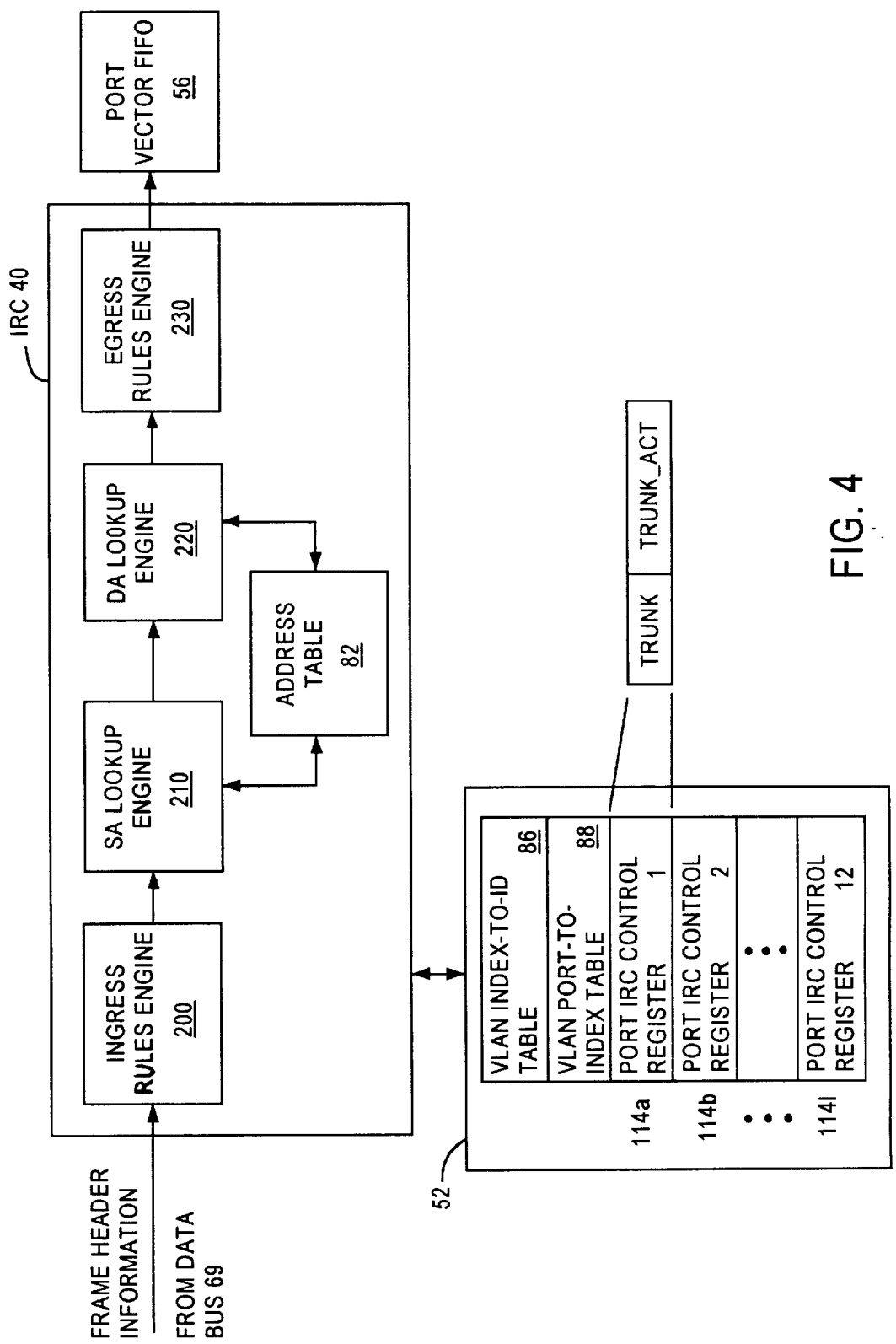
FIG. 4 is a block diagram of a system including the internal rules checker of FIG. 2 in accordance with an embodiment of the present invention.

In the exemplary embodiment illustrated in FIG. 4, the IRC 40 includes address table 82. In alternative embodiments, the address table 82 may be located outside the IRC 40 with in another part of the multiport switch 12 or even external to the multipart switch 12.

According to the exemplary embodiment, the address table 82 supports 4096 user addresses and capabilities for 64 unique virtual local area networks (VLANs). However, the number of addresses and VLANs supported may be increased by expanding the table size. VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network.

Figure 5:
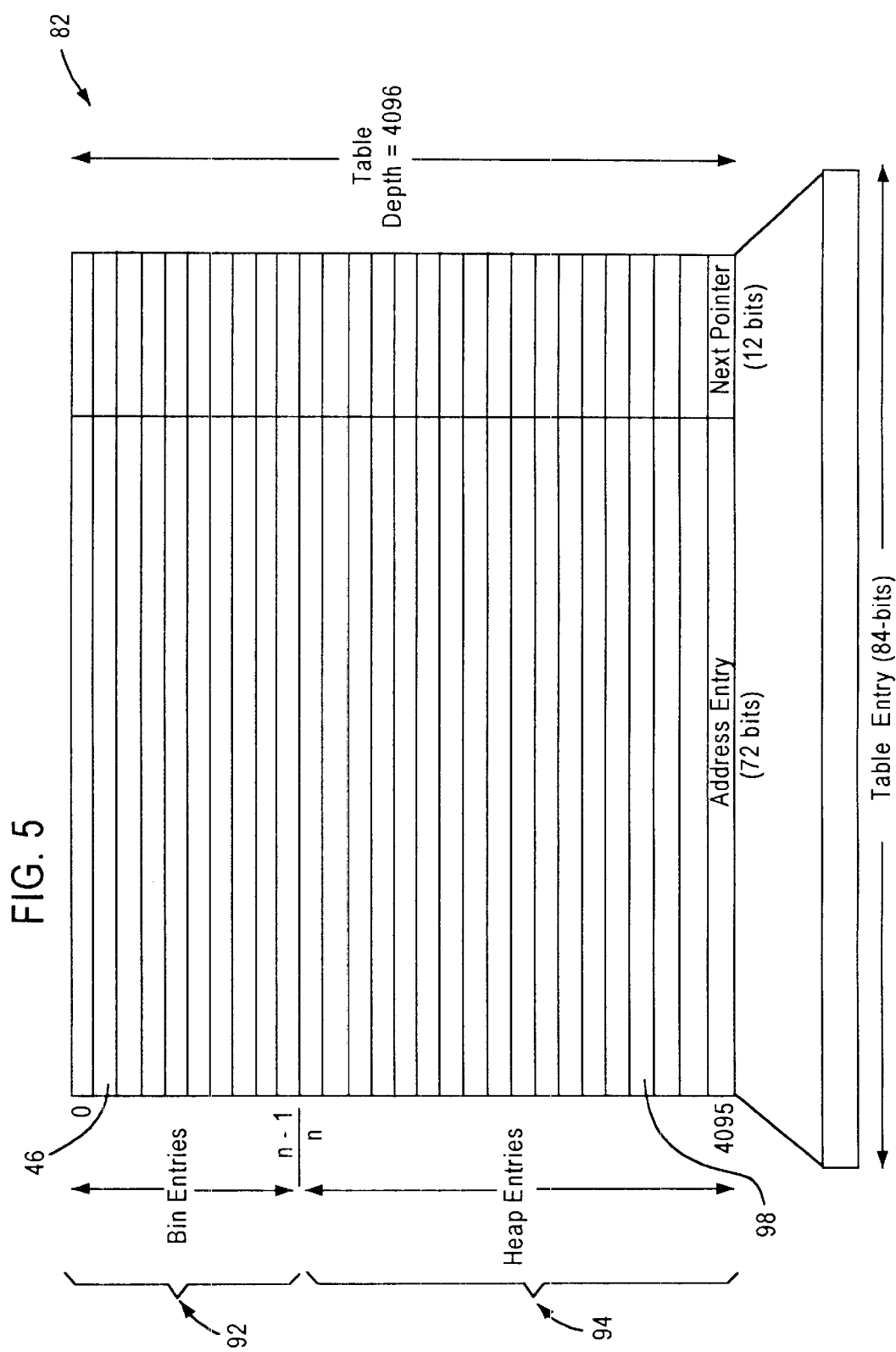
FIG. 5 illustrates the composition of the IRC address table of FIG. 4.

FIG. 5 illustrates the organization of the IRC address table 82. The IRC address table 82 contains an array of 4096 entries. The first "n" entries 92 are referred to as "bin entries" and have addresses from "0" to "n−1". The remaining entries 94 are referred to as "heap entries" and have addresses from "n" to "4095". Each of the table entries includes a 72-bit address entry field and a 12-bit "next pointer" field.

Figure 6:
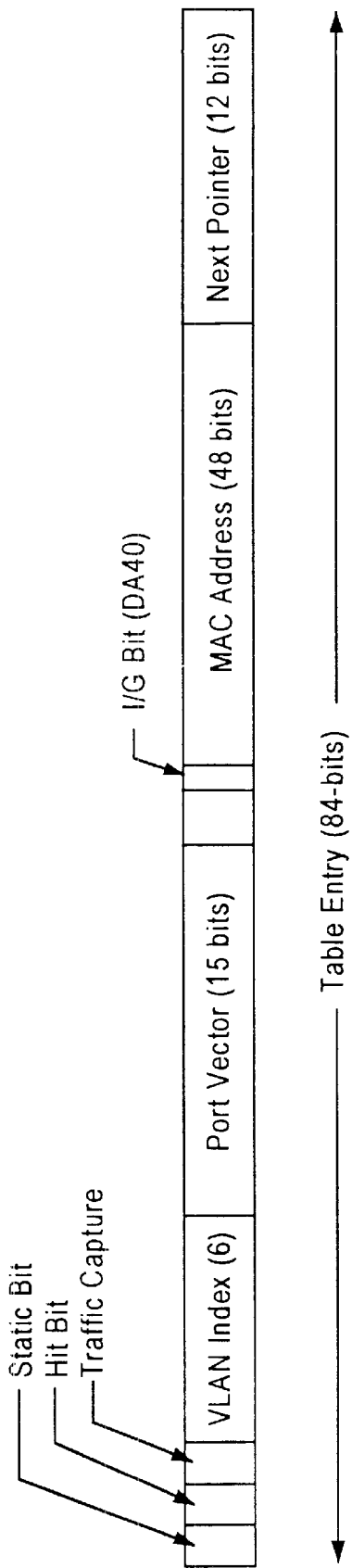
FIG. 6 illustrates the format of an IRC address table entry of the IRC address table of FIG. 5.

FIG. 6 illustrates the composition of each 84-bit table entry shown in FIG. 5. The hit bit is used for address entry "aging" to delete entries from the address table 82 that have not been used in a predetermined amount of time. The static bit is used to prevent deletion of an address entry.

The traffic capture bit identifies traffic capture source and destination MAC addresses for mirroring MAC conversations to the management queue 68.

The VLAN index field is a 6-bit field used to reference a 12-bit VLAN identifier (ID). The VLAN index-to-VLAN ID table 86, shown in FIG. 4, contains the mapping associations. The switch 12 receives both tagged and untagged frames. When the switch 12 receives untagged data frames, i.e., without VLAN tag information, the IRC 40 assigns a VLAN index from the VLAN port-to-index table 88, shown in FIG. 4, based on the receive port on which the frame is received. The VLAN index-to-ID table 86 and the VLAN port-to-index table 88 are located with the configuration and status registers 52. However, in alternative configurations, the tables 86 and 88 may be-located within the IRC 40.

The port vector is a 15-bit field that provides a forwarding descriptor with a vector identifying the port(s) to which the frame should be forwarded.

The MAC address field is a 48-bit field that includes addresses for both source addresses and destination addresses. The addresses can be unicast, multicast or broadcast. An individual/group (I/G) bit is also included in the MAC address field.

In the exemplary embodiment of the present invention, the host CPU 32 functions as the management entity and is connected to the IRC 40 via the CPU IF 50. Alternatively, a management MAC may be connected to the CPU IF 50 to function as the management entity.

The host CPU 32 is responsible for initializing the values in the address table 82. Upon power-up, the host CPU 32 loads values into the address table 82 based on the network configuration, including VLAN configurations. The IRC 40 uses the specific fields of the address table 82 to make frame forwarding decisions when frames are received in the switch 12. More specifically, the IRC 40 uses engines 200–230 to search the address table 82 for frame forwarding information and creates a forwarding descriptor for output to the port vector FIFO 56.

As discussed previously, engines 200–230 are separate logic engines and therefore are able to process data frames independently, thereby increasing data throughput as compared to systems which process a single frame at a time. In other words, each logic engine is able to perform its respective processing on a different data frame simultaneously with the other respective logic engines. The operation of each logic engine will be described briefly below.

The ingress rules engine 200 performs a variety of pre-processing functions for incoming data frames. For example, ingress rules engine 200 checks to see if the corresponding MAC detected any transmission errors when the frame was received. The ingress rules engine 200 also checks the source address of the received frame to determine whether the Individual/Group (I/G) bit is set. If the I/G bit is set, the ingress rules engine 200 handles the frame as if the frame was received with errors. That is, when a received error has occurred, the ingress rules engine 200 creates a forwarding descriptor with a null port vector that causes the frame to be discarded. Alternatively, the ingress rules engine 200 may forward the error frame to the host CPU 32 for diagnostic purposes.

The ingress rules engine 200 also checks the MAC DA of the frame to determine if the frame should be sent to the management entity, e.g., host CPU 32. Specifically, the ingress rules engine 200 looks for Bridge Protocol Data Units (BPDUs), Generic Attribute Registrations Protocol (GARP) frames, MAC Control Frames and Physical MAC Addresses. The ingress rules engine 200 identifies these types of frames based on their specific destination address information.

Optionally, the ingress rules engine 200 performs VLAN ingress filtering to prevent the multiport switch 12 from forwarding a frame that does not belong to a VLAN associated with the receiving port. The ingress rules engine 200 accesses a VLAN member set table, which indicates which VLANs are associated with each port, and determines whether a particular frame belongs to a VLAN associated with the receiving port. When a frame fails the ingress filtering, the ingress rules engine 200 generates a forwarding descriptor with a null port vector, without performing SA or DA lookups, or egress rules operations.

After processing by ingress rules engine 200, the IRC 40 performs SA and DA searches of address table 82. The multiport switch 12 needs to make frame forwarding decisions relatively quickly, since multiple data frames may be received by the multiport switch 12 simultaneously. Hence, in the exemplary embodiment of the present invention, a hashing scheme is used to search only a subset of the address entries, as described below.

The memory structure of FIG. 5 provides an indexed arrangement, where a given network address will be assigned to a corresponding bin. In other words, each bin entry 96 is configured to reference a plurality of table entries (i.e., heap entries) 98. Hence, the SA lookup engine 210 performs a search of the address table 82 by first accessing a specific bin 96 pointed to by a hash key, and then searching the entries within (i.e., referenced by) the corresponding bin to locate the appropriate match.

Each bin entry 96 is the starting point for the search by the SA lookup engine 210 for a particular address within the address table 82. A bin entry may reference no addresses (i.e., be empty), may reference only one address within the bin entry location, or may reference a plurality of addresses using a linked list chain structure.

Figure 7:
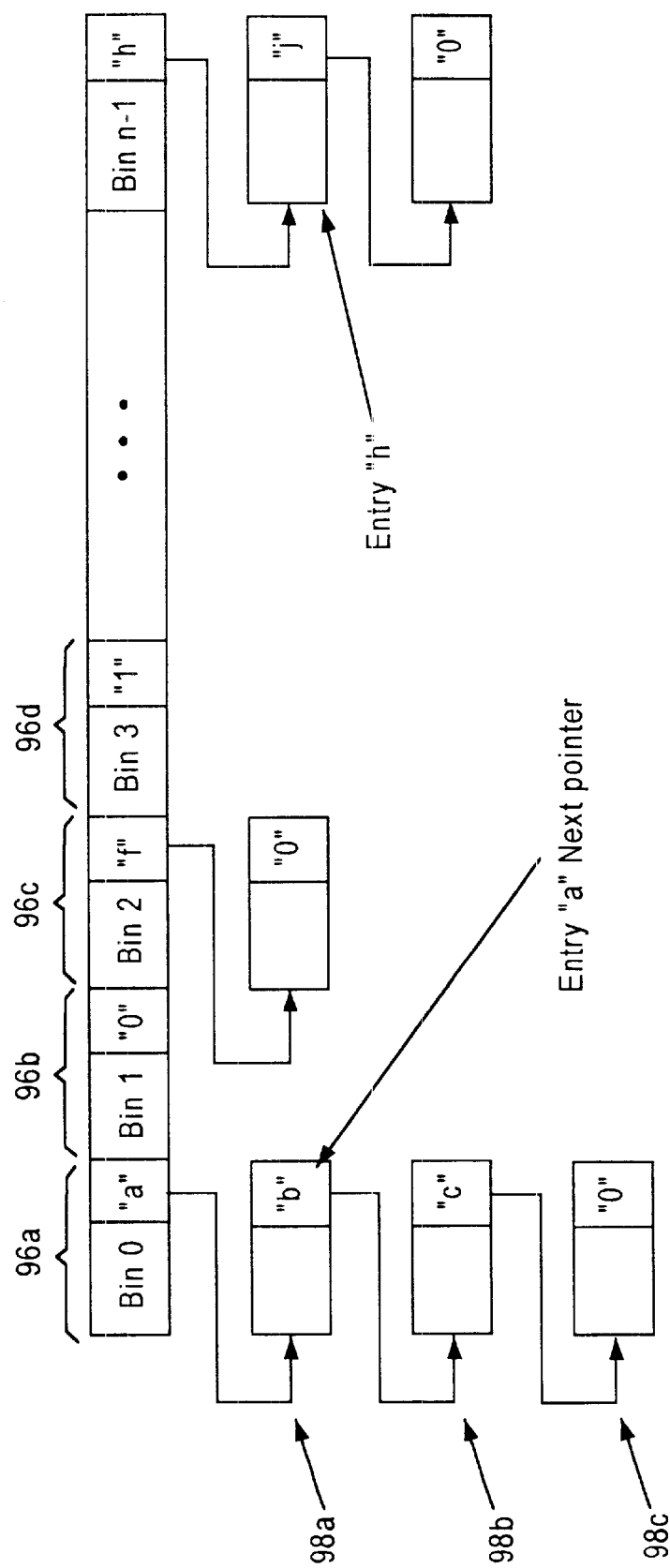
FIG. 7 illustrates linked list chains for identifying table entries relative to a selected bin.

FIG. 7 is a diagram illustrating bin entries referencing a different number of table entries. Each of the bin entries 96 and heap entries 98 includes the 72-bit address entry and a 12-bit "next pointer" field. The "next pointer" field associated with the bin entry 96 identifies the location of the next entry in the chain of linked list addresses. For example, Bin 3, 96d, of FIG. 7 does not have any associated table entries. In such a case, the contents of the 72-bit address entry are immaterial and the bin's corresponding "next pointer" field will have a value of "1", indicating no entries for the corresponding bin. If a bin such as Bin 1, 96b, contains a single table entry, the bin entry will store the switching logic data for that single address in its address entry field, and store the value "zero" in the "next pointer" field, indicating there are no further address entries in the chain. Bin 0, 96a, however, references four addresses by using the "next pointer" field to identify the location of the next entry in the chain. The additional entries 96b–96d in the bin are linked in a linear list, as shown in FIG. 7. Thus, the first entry of Bin 0 is stored in the address entry field of the bin entry 96a and the next entry (heap entry 98a) is referenced by address entry "a" in the next pointer field of the bin entry 96a.

The SA lookup engine 210 performs hash searches of the IRC address table 82 to find entries associated with the source address and VLAN index of a received data frame.

Figure 8:
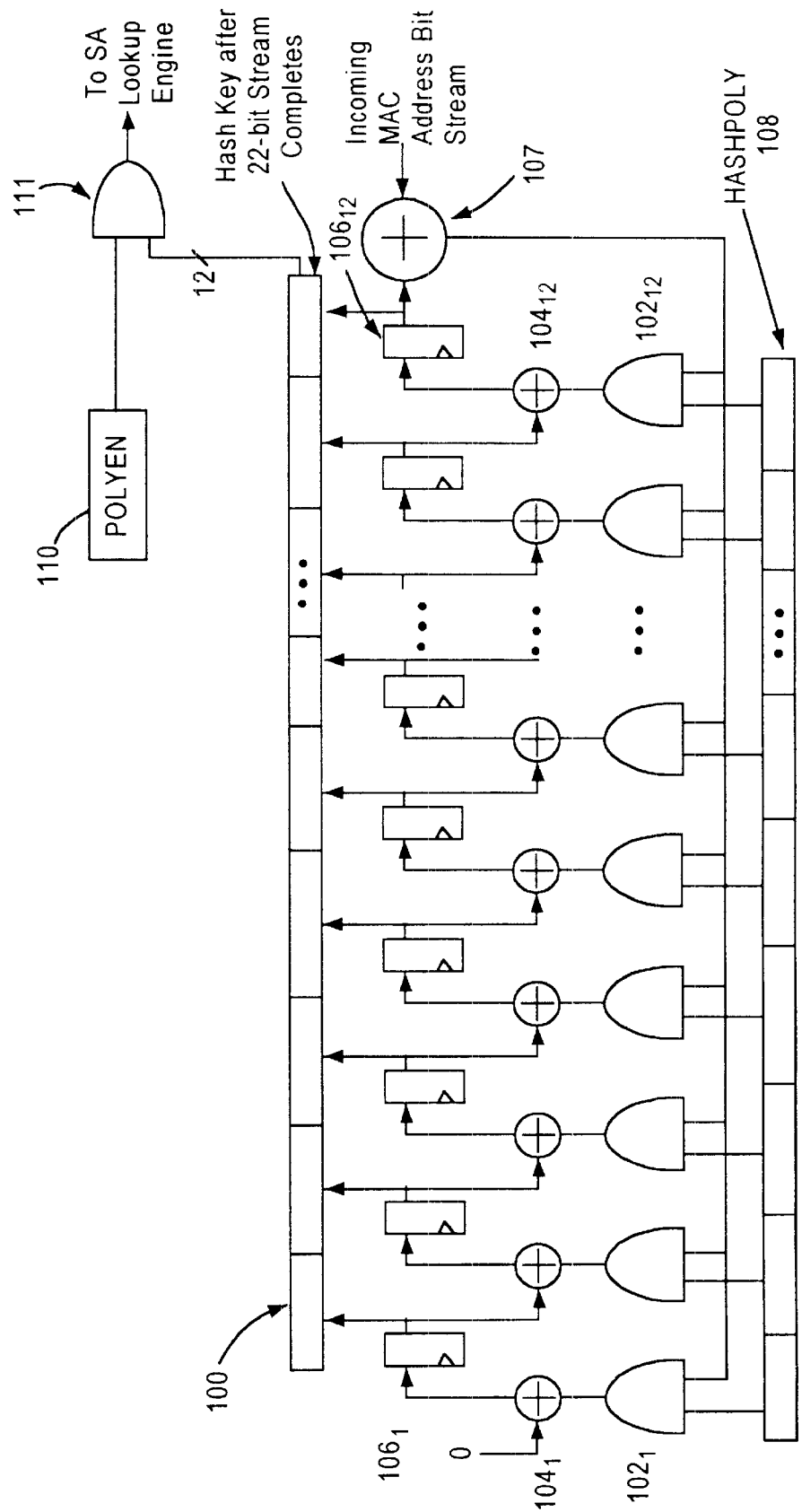
FIG. 8 illustrates a hash function circuit used with the internal rules checker of FIG. 2.

FIG. 8 is a block diagram illustrating an exemplary hash function circuit 100 used in conjunction with the SA lookup engine 210 in accordance with an embodiment of the present invention. The hash function circuit 100 includes a series of AND gates 102, a series of exclusive OR (XOR) gates 104, and a shift register 106. A user-specified hash function, stored in a user-programmable register (HASHPOLY) 108, includes a 12-bit value defining the hash polynomial used by the hash function circuit 100. Exemplary hash polynomials for the hashing function of the present invention are $x^{12}+x^{10}+x^7+x^3+x^2+1$, which has a HASHPOLY of 0100 1000 1101, $x^{12}x^{10}+x^5+x^3+1$, which has a HASHPOLY of 0100 0010 1001 and $x^{12}+x^{10}+x^8+x^7+x^4+x^2+1$, which has a HASHPOLY of 0101 1001 0101. The $x^{12}$ term is assumed to always equal "1", and therefore is not stored in the HASHPOLY register 108. Other polynomials may also be used for HASHPOLY based on the particular design requirements.

The hash function circuit 100 generates the hash key using the source address of the data packet according to a user-specified hash function. Initially, the IRC controller 82 concatenates the 16 least significant bits of the source address of the data packet with the VLAN index to create a search key. After the entire search key has been processed, the hash function circuit 100 outputs a 12-bit hash key.

From the 12-bit hash key, the SA lookup engine 210 calculates a bin number for searching the appropriate bin list in address table 82. More particularly, the SA lookup engine 210 uses the lower POLYEN bits of the hash key to generate the bin number. The bin number falls in the range of [0, n−1] where n=$2^{POLYEN}$ and the value of POLYEN is programmed by the host CPU 32 and stored in register 110. The hash key output by the hash function circuit 100 is provided to a logic circuit, for example a 12-bit parallel AND gate 111, that selectively outputs the lower significant bits of the hash key based upon a polynomial enable value (POLYEN) stored in register 210. The field "POLYEN" defines how many bits of the hash key-are used to create the bin number. For example, if POLYEN=5, then the SA lookup engine 210 uses the lower five bits of the hash key. Hence, the hash key output by the logic circuit 100 is based upon masking the 12-bit hash key using the stored register value POLYEN in register 110.

After the bin number is calculated, the SA lookup engine 210 searches the bin list of the particular bin for an address entry whose address and VLAN index fields match the source address (SA) and VLAN index of the received frame.

If the SA lookup engine 210 finds an address entry whose address and VLAN index match the SA and VLAN index of the frame, the SA lookup engine 210 sets ihe hit bit for that address entry. If the SA lookup engine 210 does not find a match and "learning", i.e., adding new entries to the address table 82, is enabled, the SA lookup engine 210 constructs a new entry in the IRC address table 82 using the information from the received frame.

After the SA lookup engine 210 completes the search and adds a new entry, if necessary, the DA lookup engine 220 searches the address table 82 for an address entry whose address and VLAN index match the destination address (DA) and VLAN index of the frame. The DA lookup engine 220 uses the 12-bit hash function circuit 100, illustrated in FIG. 8, to generate a 12-bit hash key for the DA/VLAN index search. The DA lookup engine 220 generates the hash key in a similar manner as discussed for the SA lookup engine 210, with the difference being that the hash function circuit 100 uses the destination address information to generate the search key and hash key. The DA lookup engine 220 then uses the lower POLYEN bits of the hash key to calculate the bin number in the address table 82. The DA lookup engine 220 then searches the appropriate bin list for a DA/VLAN index match in the address table 82. If a match is found, the DA lookup engine 220 uses the port vector field of the address entry and passes the port vector field information to the egress rules engine 230. When the DA lookup engine 220 cannot find a DA/VLAN index match, the frame must be "flooded" to all members of the VLAN. In this case, the DA lookup engine 220 sets the port vector to indicate that all ports are to transmit the frame.

After the DA lookup engine 220 generates the port vector, the egress rules engine 230 receives the port vector information along with the receive port number and VLAN ID information. The egress rules engine 230 then creates a forwarding descriptor for the frame.

FIG. 9 illustrates the composition of the forwarding descriptor according to an embodiment of the present invention. Referring to FIG. 9, the priority class field is a one-bit field that indicates the output priority queue in which the frame pointer should be placed, e.g., high priority or low priority.

The port vector field is a 15-bit field that identifies each port(s) that should receive the data frame for transmission to its destination address. Bit 0 of the port vector field corresponds to Port 0 (the management port), bits 1–12 correspond to MAC ports 1–12 respectively (the 10/100 Mb/s ports), bit 13 corresponds to the gigabit port 24 and bit 14 corresponds to the expansion port 30.

The untagged set field is a four-bit field that indicates which ports should remove VLAN tag headers before transmitting frames. The untagged set is obtained from an untagged set table. The Rx port is a four-bit field that indicates the port from which the frame was received.

The VLAN ID field is a 12-bit field that includes the VLAN identifier associated with the frame. The opcode is an 11-bit field that contains instructions about how the frame should be modified before transmission and information that the host CPU 32 can use for processing frames from the management queue. The frame pointer is a 13-bit field that contains the location of the frame stored in external memory 36.

Once the necessary forwarding information has been obtained, the egress rules engine 230 outputs the forwarding descriptor to the port vector FIFO 56 for queuing, as shown in FIG. 3.

Trunking Function

As discussed previously, the multiport switch 12 includes twelve ports that are enabled for 10/100 Mb/s operation. Trunking is a technique which treats two or more point-to-point connections between the same two devices as a single network link. Trunking enables the multiport switch 12 to obtain a higher bandwidth path between two devices, e.g., two network stations, two switches or a server and a switch, by linking multiple ports to form a trunk transmission path between the two end devices.

For example, suppose four ports on the multiport switch 12 are designed for 100 Mb/s data transmission rates and the trunking scheme links the four ports together to form a single trunk. The resulting trunk is able to transmit/receive data via these four ports, resulting in one 400 Mb/s link between the two end devices.

According to an exemplary embodiment of the invention, the multiport switch 12 supports up to three independent trunks, each of which is able to support two to four ports. In the exemplary embodiment, the twelve 10/100 Mb/s ports on the multiport switch 12 are divided into three trunk blocks, as shown in FIG. 10. Referring to FIG. 10, the first trunk block, trunk 1, includes ports 1–4, the second trunk block, trunk 2, includes ports 5–8 and the third trunk block, trunk 3, includes ports 9–12. Within a trunk block, any two to four adjacent ports may be combined into a single trunk. FIG. 10 illustrates the trunk membership combinations for the twelve 10/100 Mb/s ports according to the exemplary embodiment of the invention. In FIG. 10, a "T" indicates that the port is included in a trunk and a "–" indicates that the port is not included in a trunk and can therefore be used as an independent port. As discussed above in the exemplary embodiment, any two to four adjacent ports may be combined to form a single trunk. For example, with reference to FIG. 10, ports 1 and 2 can be combined to form a two-link trunk illustrated at entry A. However, ports 1 and 3 cannot be combined to form a two-link trunk because they are not adjacent to each other.

In alternative embodiments, the multiport switch 12 may include fewer ports in a single trunk block or more ports, up to the maximum number of ports of the multiport switch 12. Additionally, in alternative embodiments, the multiport switch 12 may be configured without limitation as to which ports are capable of being linked together. For example, ports 1, 3, 5, 7 and 9 could be combined in a five-link trunk.

The host CPU 32 sets the particular trunk configuration based on the particular network requirements, e.g., which end devices require a data link having a bandwidth greater than 100 Mb/s. Initially, the host CPU 32 assigns ports to specific trunks by setting trunk control bits in the respective port IRC control register 114a–l, illustrated in FIG. 4. According to the exemplary embodiment of the invention, the multiport switch 12 includes one port IRC control register 114 for each of the twelve 10/100 Mb/s ports. In alternative configurations, a single register could be used to store the appropriate control information for the twelve 10/100 Mb/s ports.

Referring to FIG. 4, each port IRC control register 114 includes two trunk control bits: a trunk bit and a trunk_act bit. A set trunk bit indicates that the corresponding port is a member of the trunk. A set trunk_act bit indicates that the corresponding port is an active member of the trunk.

Table 1 below summarizes the various combinations of trunk control bits and how frames are to be forwarded based on these combinations.

TABLE 1

Summary of Trunk Control Bits

| TRUNK | TRUNK_ACT | |
|---|---|---|
| 0 | X | Port is not in a trunk. Frames destined for this port will not be redirected to another port. |
| 1 | 0 | Port is part of the trunk but is inactive, probably because a link has failed. Frames destined for this port will be redirected to another port in the trunk. |
| 1 | 1 | Port is an active part of the trunk. Frames can be transmitted from this port. |

Referring to Table 1, when the trunk bit is "0", the corresponding port is not a member of a trunk and frames destined for this port will not be redirected to another port, regardless of the trunk_act bit. When the trunk bit is "1" and trunk_act bit is "0", the corresponding port is part of the trunk, but is inactive, possibly due to a link failure. Frames destined for this port will be redirected to another port in the trunk. When the trunk bit is "1" and the trunk_act bit is "1", the corresponding port is an active part of the trunk and frames can be transmitted from this port, as described in more detail below.

Advantageously, using the port IRC control registers 114a–l to store trunking information enables the present invention to support trunking without storing specific trunking information in the IRC address table 82. Additionally, the use of two bits per port, i.e., trunk and trunk_act bits, to indicate trunk membership allows the host CPU 32 to reconfigure the trunk without changing the IRC address table 82 when a link is broken/restored or when the host CPU 32 changes the network trunking configuration. For example, suppose the host CPU 32 is to remove port 2 as an active port on trunk 1. The host CPU 32 accomplishes this by clearing the trunk_act bit in the corresponding port IRC control register 114.

Figure 11:
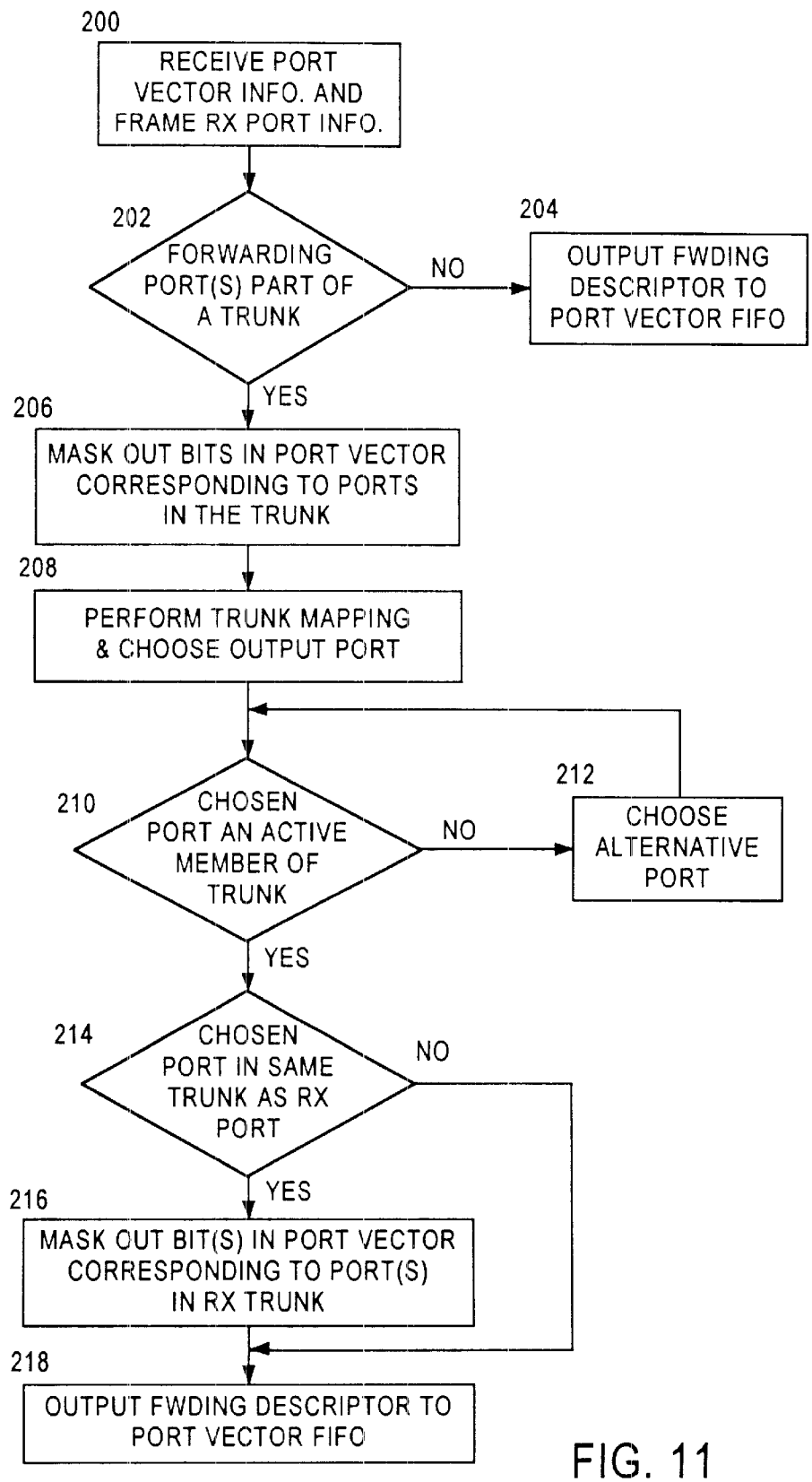
FIG. 11 is a flow diagram illustrating a trunking function according to an embodiment of the present invention.

As discussed previously, when a frame is received, the IRC 40 processes the frame in four stages via ingress rules engine 200, SA lookup engine 210, DA lookup engine 220 and egress rules engine 230, respectively. After the DA lookup engine 220 completes the DA lookup, the egress rules engine 230 receives and examines the port vector information and determines from the IRC port control register 114 whether the frame is to be transmitted through a port that is part of a trunk. When the frame is to be transmitted through a trunk port, the egress rules engine 230 determines the specific port in the trunk through which the frame will be transmitted. FIG. 11 is a flow diagram illustrating the method of generating frame forwarding information in connection with trunking. Referring to FIG. 11 at step 200, the egress rules engine 230 receives the port vector information and the receive port information from the DA lookup engine 220. Next, at step 202, the egress rules engine 230 compares the port vector information with the information stored in the corresponding IRC port control register(s) 114. The egress rules engine 230 then determines whether a forwarding port is part of a trunk. That is, the egress rules engine 230 examines the trunk bit in each IRC port control register corresponding to a port(s) identified by the port vector.

When a forwarding port is not part of a trunk, i.e., the trunk bit is "0", the egress rules engine 230 outputs the forwarding descriptor to the port vector FIFO 56, at step 204. However, when a forwarding port is part of a trunk, i.e., the trunk bit is "1", the egress rules engine 230 masks out all bit(s) in the port vector that correspond to the trunk port(s), at step 206.

Figure 12:
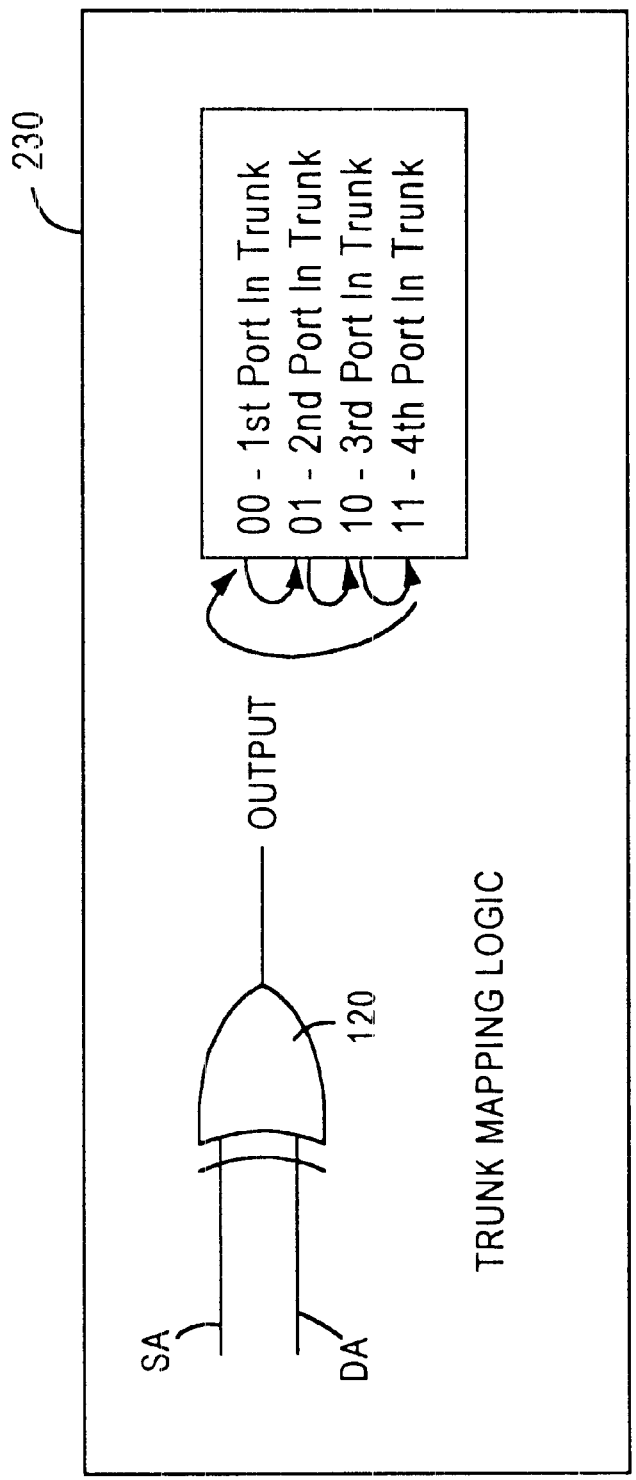
FIG. 12 is a diagram illustrating trunk mapping logic according to an embodiment of the present invention.

Next, at step 208, the egress rules engine 230 performs a trunk mapping operation to determine the port through which the frame will be transmitted. According to the exemplary embodiment illustrated in FIG. 12, the trunk mapping logic includes an exclusive OR (XOR) gate 120. Referring to FIG. 12, the trunk mapping logic receives the two least significant bits of the frame's SA and DA and XORs the bits to generate a two bit output. The egress rules engine 230 then selects one of the ports in the trunk to transmit the data on, based on the two bit output.

According to the exemplary embodiment illustrated in FIG. 12, an output bit pattern of "00" from XOR gate 120 corresponds to the first port in the trunk block. Output bit patterns "01", "10" and "11" correspond to the second through fourth ports in the trunk block, respectively.

For example, assume that the port vector includes information indicating that the frame is to be transmitted on port 2, i.e., bit 2 of the 15-bit port vector is set, and port IRC control register 114b indic port 2 is an active member of trunk 1, i.e., both trunk and trunk_act are "1". Further assume that the two least significant bits of the source address of the received frame are "01" and the two least significant bit of the destination address of the received frame are "10". Referring to FIG. 12, the egress rules engine 230 XORs "01" and "10" via XOR gate 120 and outputs "11". In this scenario, the egress rules engine 230 chooses the fourth port in trunk 1, shown in FIG. 4, i.e., port 4.

In alternative configurations, other trunk mapping functions may be used to determine the output port from which to transmit a data frame. Advantageously, the particular trunk mapping function used in the present invention optimizes the effective data transmission rate between the two end devices by distributing the transmission of data frames relatively equally among the ports in the trunk. Additionally, in configurations where more than four ports are included in a single trunk, the trunk mapping function utilized would require more than a two bit output to choose the trunk port. For example, if eight ports were included in a trunk, a three bit output would be required to choose the output port from among the eight ports.

Next, at step 210, the egress rules engine 230 determines whether the port chosen at step 208 is an active port of the trunk. That is, the egress rules engine 230 determines whether either the trunk bit of the port IRC port control register 114 for the port chosen at step 208, is "0", indicating the port is not in the trunk, or the trunk_act bit is "0", indicating that the port is not an active link in the trunk.

When the determination at step 210 is "no", the egress rules engine 230 chooses an alternative port in the same trunk, at step 212. According to the exemplary embodiment, the egress rules engine 230 chooses the next higher port in the trunk block, as indicated by the arrows in FIG. 12. For example, if the third port in the trunk is chosen at step 208 and the egress rules engine at step 210 determines that the chosen port is not an active member of the trunk, the egress rules engine 230 chooses the fourth port in the trunk. The egress rules engine then returns to step 210 and repeats the process until the chosen port is an active member of the trunk. For example, if the fourth port of the trunk block is chosen at step 210 and is not an active member of the trunk, the egress rules engine 230 would choose the first port of the trunk block. In alternative embodiments of the present invention, other methods of choosing an alternate port can be employed, e.g., choose the next lower port in the trunk block when the chosen port is not an active link in the trunk.

After an active port in the trunk is chosen, the egress rules engine 230, at step 214, then checks whether the data frame was received on a trunk port that is part of the same trunk on which the frame is to be transmitted. That is, the egress rules engine 230 checks the contents of the port IRC control register 114 corresponding to the receive port on which the frame was received to determine whether the trunk bit is set. When the determination at step 214 is "no", the egress rules engine 230 outputs the forwarding descriptor to the port vector FIFO 56, at step 216. When the determination at step 214 is "yes", the egress rules engine 230, at step 216, masks out all bits in the port vector that correspond to port(s) included in the same trunk as the receive port. In this manner, the egress rules engine 230 ensures that data frames that are received on a trunk port will not be forwarded on the same trunk. Advantageously, this saves processing time associated with transmitting a data frame back to its source.

Next, at step 218, the egress rules engine 230 outputs the forwarding descriptor, including the port vector, to the port vector FIFO 56. The flow diagram illustrated in FIG. 11 is applicable for data frames received by multiport switch 12. However, when the host CPU 32 originates a transmission, the IRC 40 does not modify the port vector information generated by the host CPU 32, thereby bypassing the trunking algorithm illustrated in FIG. 11.

Link Failure Link Recovery

As discussed previously, the trunking function enables the multiport switch 12 to obtain a higher bandwidth path between two devices, e.g., two network stations, two switches or a server and a switch, by linking multiple ports to form a trunk transmission path between the two end devices.

However, when one of the links in a trunk fails, the host CPU 32 reconfigures that particular trunk to ensure that no data frames are output via a failed link. The host CPU 32 also ensures that frames from the same data stream are not delivered out of order while the trunk configuration is being changed.

Figure 13:
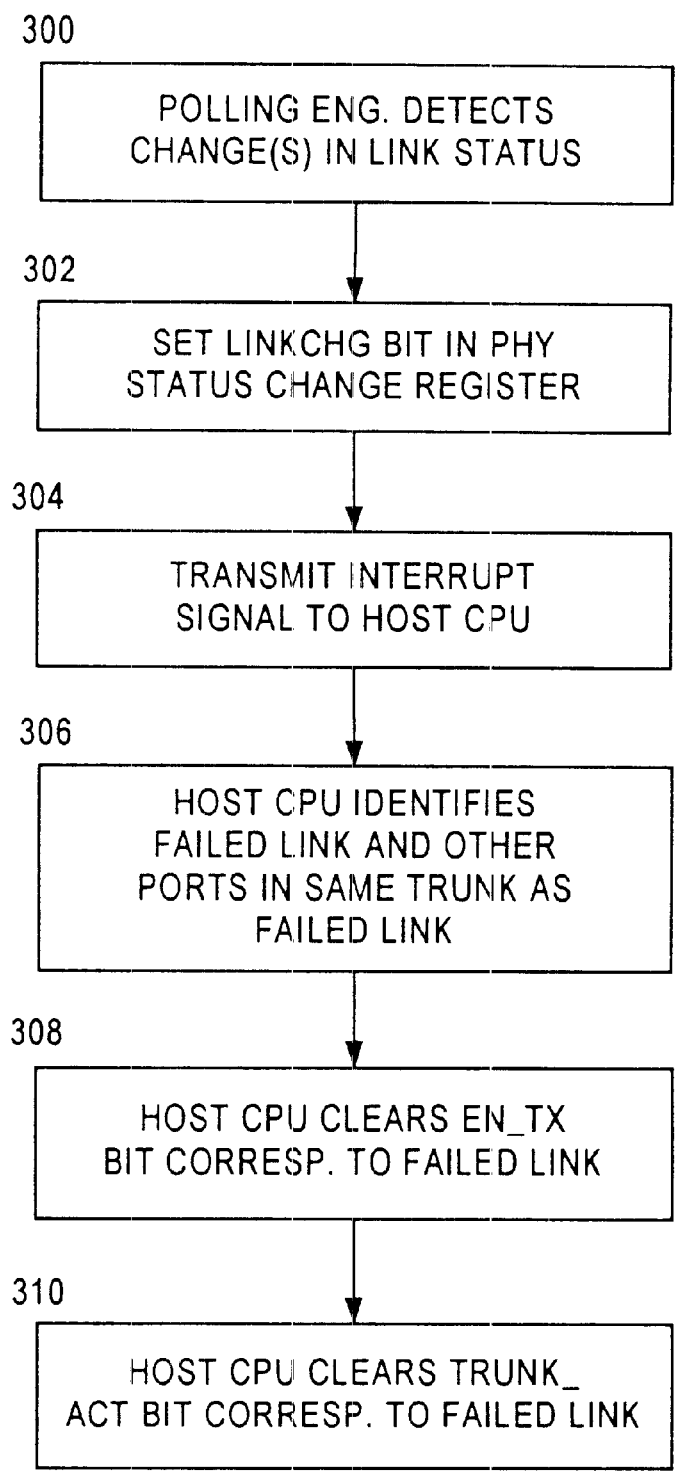
FIG. 13 is a flow diagram illustrating how a link failure is handled according to an embodiment of the present invention.
Figure 14:
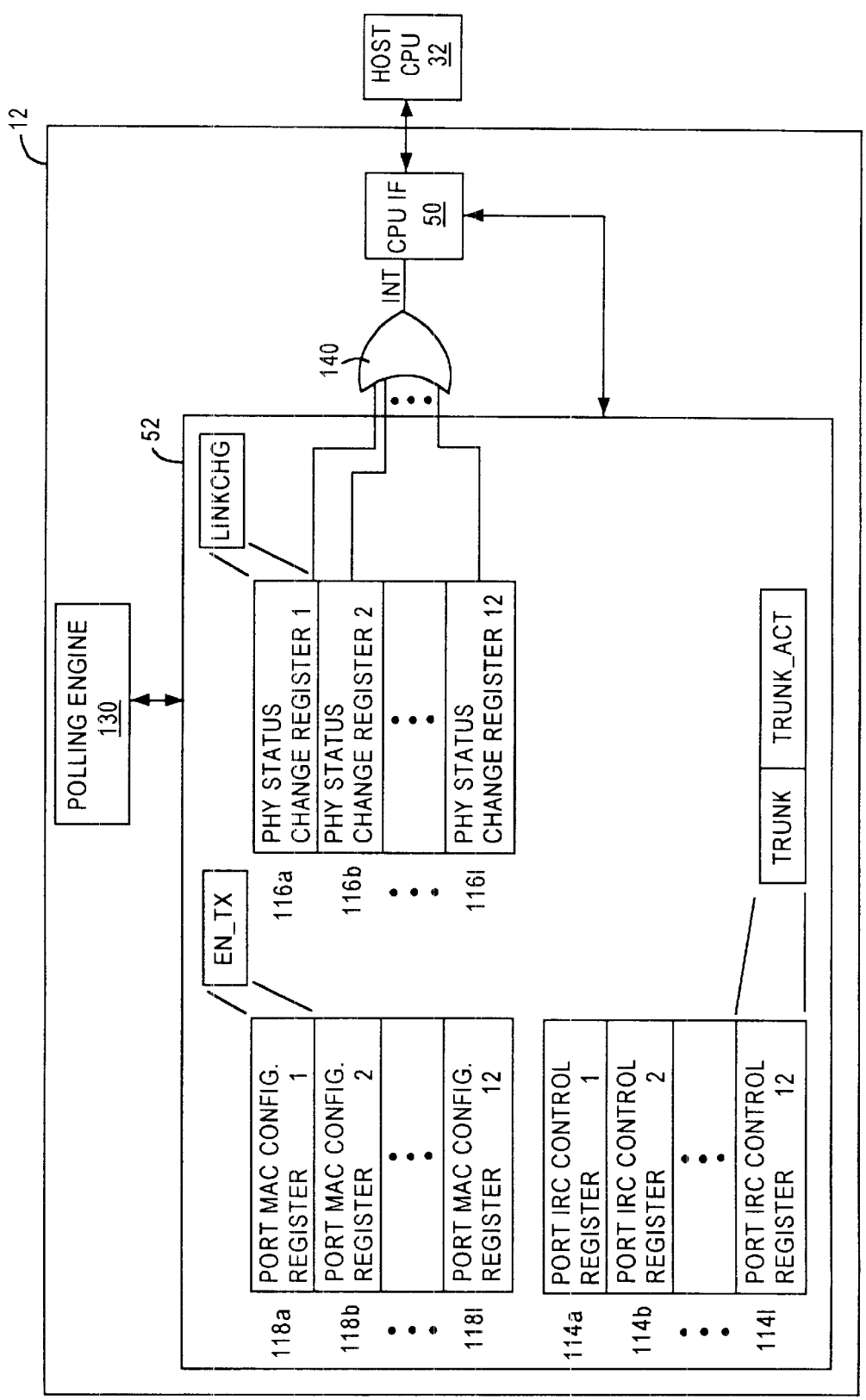
FIG. 14 is a block diagram of a system including configuration and status registers used in link failure and link recovery according to an embodiment of the present invention.

FIG. 13 is a flow diagram illustrating the method for deactivating trunk ports and reconfiguring the trunk after a link failure has occurred, according to an embodiment of the present invention. FIG. 14 is a block diagram illustrating the components used in connection with the method of FIG. 13, according to an embodiment of the present invention. Referring to FIG. 14, the multiport switch 12 includes polling engine 130 that includes logic to automatically check, at predetermined intervals, the conditions of each of the external links from the multiport switch 12 to the respective end devices, e.g.,. network stations 14. The polling engine 130 determines the link status, i.e., link "up" or link "down", associated with each of the respective ports. The polling interval is programmable and can be set to any predetermined interval based on the particular network requirements. The polling engine 130 can also employ any particular method that would be known to one of ordinary skill in this art to determine link status, e.g., detecting discontinuity or a break in the link, the details of which are not disclosed herein in order not to unduly obscure the thrust of the present invention.

The multiport switch 12 also includes one PHY status change register 116, illustrated in FIG. 14, for each of the twelve 10/100 Mb/s ports. Each of the PHY status change registers 116 includes a link change (linkchg) bit for indicating whether the link status has changed since the previous reading by host CPU 32. In the exemplary embodiment, a linkchg bit of "1" indicates that the link status has changed since the previous reading by host CPU 32, described in more detail below, and a linkchg bit of "0" indicates that the link status has not changed since the previous reading by host CPU 32. In alternative configurations, the PHY status change registers 116 may be configured to store information indicating whether the link is up or down, not whether the link status has changed. Additionally, in alternative configurations, a single register could be used to store the link status information for the twelve 10/100 Mb/s ports. The multiport switch 12 also includes one port MAC configuration register (PMCR) 118 for each of the twelve 10/100 Mb/s ports. Each of the PMCRs includes an enable transmission (en_tx) bit for indicating whether data transmission is enabled for the respective port. In the exemplary embodiment, an en_tx bit of "1" indicates transmission is enabled and an en_tx bit of "0" indicates transmission is disabled. In alternative configurations, a single register could be used to store the corresponding transmission configuration information for the twelve 10/100 Mb/s ports.

Referring to FIG. 13 at step 300, assume the polling engine 130 detects a change in status of a physical link, e.g., one of the links went from link up to link down. Next, at step 302, the polling engine 130 sets the linkchg bit in the corresponding PHY status change register 116 to "1". For example, suppose polling engine 130 at step 300 detected a change in link status associated with port 2. The polling engine 130 then sets the linkchg bit in PHY status change register 116b to "1". This indicates that the status of the link coupled to port 2 has changed since the previous polling.

Next, at step 304, the multiport switch 12 transmits the change in link status indication to the host CPU 32 as an interrupt signal. According to the exemplary embodiment illustrated in FIG. 14, each of the linkchg bits are inputted to OR gate 140 and the output of OR gate 140 is coupled to the host CPU 32 via CPU IF 50. When the contents of any one of the PHY status change registers 116 is "1", the output of OR gate 140 is "1" and the CPU IF 50. transmits this "1" as an interrupt signal to host CPU 32. The host CPU 32 receives the interrupt indication from CPU IF 50 and is thereby alerted that a physical status change has occurred in one or more of the links.

The host CPU 32, at step 306, then determines which port is associated with the link failure and which other ports, if any, are included in the same trunk as the failed port. To accomplish this, the host CPU 32 reads the contents of the PHY status change registers 116 to identify the particular register whose contents are "1", thereby identifying the particular link(s) whose status has changed. After the linkchg bit is read by host CPU 32, the linkchg bit is cleared. Advantageously, clearing the linkchg bit in this manner saves processing time by not requiring the host CPU 32 to make a separate I/O access to clear the linkchg bit.

Next, the host CPU 32 reads the contents of the port IRC control registers 114, illustrated in FIG. 14, that may be in the same trunk as the failed link to determine whether the failed link is part of a trunk and which other port(s) are active links in same trunk. For example, assume that port 2 experiences a link failure. As discussed previously, host CPU 32 receives an interrupt signal via CPU IF 50. The host CPU 32 then reads the contents of PHY status change registers 116 and determines the contents of register 116b to be "1". The host CPU 32 is then aware that port 2 has failed. Next, the host CPU 32 reads port IRC control register 114b, to determine whether port 2 is an active part of trunk 1, i.e., both trunk and trunk_act are set to "1".

In an alternative configuration, the host CPU 32 may bypass reading the port IRC control registers to determine whether a failed port is an active part of a trunk by saving the trunking information in host CPU 32 memory at setup time. Advantageously, retrieving the trunking information from host CPU 32 memory is faster than reading the trunking information from the port IRC control registers 114.

Next, assume that the host CPU 32 determines that port 2 is an active part of trunk 1, either by reading port IRC control register 114b or by retrieving the information from host CPU 32 memory. The host CPU 32 then reads the contents of the other port IRC control registers 114 that correspond to ports that may be in trunk 1, i.e., 114a, 114c and 114d in the exemplary trunking configuration illustrated in FIG. 10, to determine the other active port(s) in the trunk. In an alternative configuration, the host CPU 32 may access host memory 32 to determine the other active port(s) in the trunk.

Next, at step 308, the host CPU 32 clears the enable transmit (en_tx) bit in the PMCR 118 that corresponds to the failed link, thereby disabling the link. In the example described above, the host CPU 32 clears the en_tx bit in PMCR 118b, corresponding to port 2. Clearing the en_tx bit causes the switch subsystem 42 to "flush", i.e., discard, any frames that are queued for transmission from the disabled port. Advantageously, flushing these frames ensures that data frames from the same stream are not delivered out of order, thereby avoiding data errors at the end device.

Next, at step 310, the host CPU 32 clears the trink_act bit in the port IRC control register 114 that corresponds to the trunk port that has been disabled. In the example above, the host CPU 32 clears the trunk_act bit in port IRC control register 114b, corresponding to port 2. This ensures that additional data frames will not be queued for transmission via the disabled trunk port and that the IRC 40 will route traffic to one of the remaining good links in the trunk, if any such links exist.

For example, in the scenario described above in which port 2 experienced a link failure, assume port 1, 2 and 3 were active links in the trunk. The IRC 40 then uses ports 1 and 3 to route data traffic on the trunk, bypassing port 2.

In the manner described above, the multiport switch 12 is advantageously able to process a link failure associated with a trunk port in a quick and efficient manner without reprogramming the address table, thereby reducing potential network downtime. The multiport switch 12 is also able to ensure that frames are not transmitted out of order when a link failure occurs.

Figure 15:
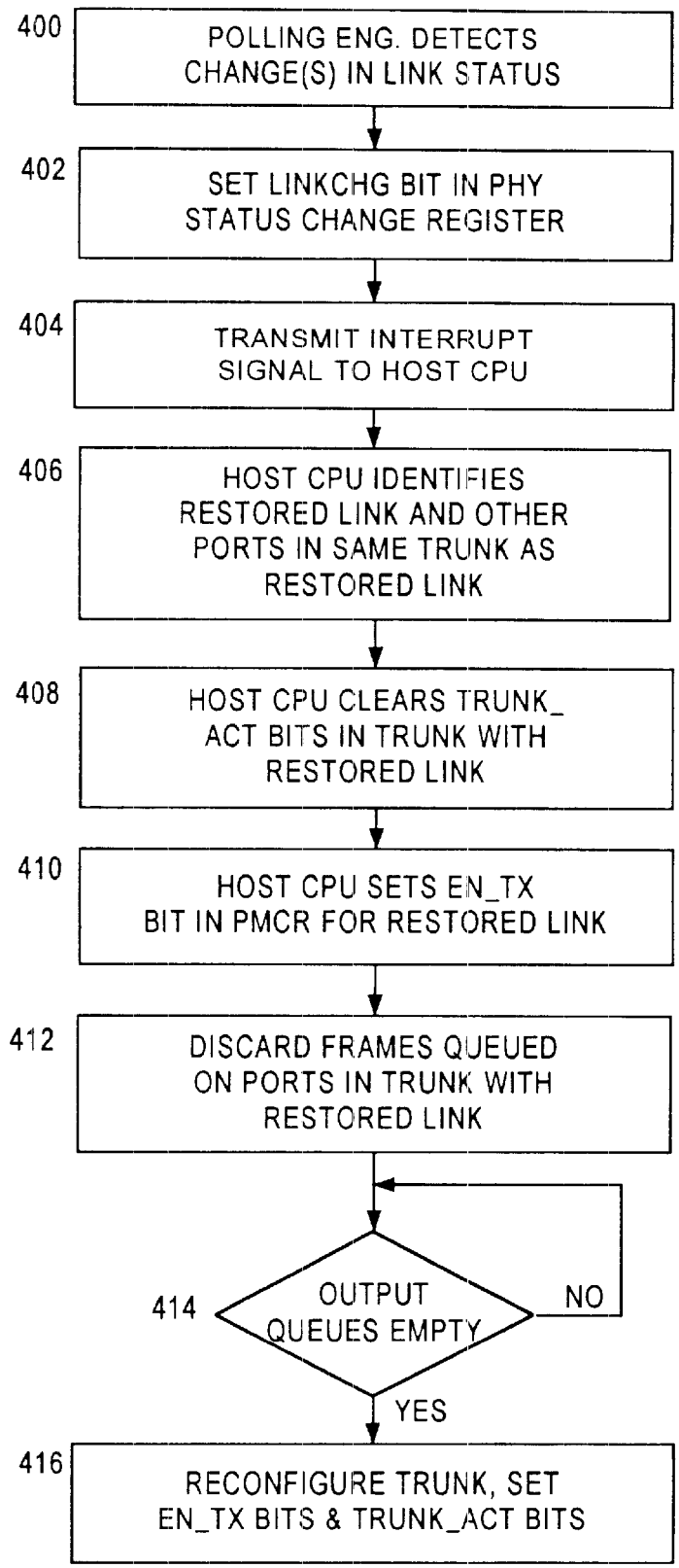
FIG. 15 is a flow diagram illustrating how a link recovery is handled according to an embodiment of the present invention.

FIG. 15 is a flow diagram illustrating the method for handling a link recovery after a failed link returns to proper working status, according to an embodiment of the present invention. Referring to FIG. 15 at step 400, when the link status of a failed link changes back to link "up", e.g., after the link has been restored to proper operating conditions, the polling engine 130 detects the change in link status.

Next, at step 402, the polling engine 130 sets the linkchg bit in the corresponding PHY status change register 116 to "1". For example, suppose polling engine 130 at step 400 detected a change in link status associated with port 2, i.e., the link recovered to link up status. The polling engine 130 then sets the linkchg bit in PHY status change register 116b to "1".

Next, at step 404, the multiport switch 12 transmits the change in link status indication to the host CPU 32 as an interrupt signal. As discussed previously in connection with FIG. 14, each of the linkchg bits are inputted to OR gate 140 and the output of OR gate 140 is coupled to the host CPU 32 via CPU IF 50. The host CPU 32 receives the interrupt indication from CPU IF 50 and is thereby alerted that a physical status change has occurred in one or more of the links.

The host CPU 32, at step 406, then determines which port is associated with the link recovery and which other ports, if any, are included in the same trunk as the recovered link. To accomplish this, the host CPU 32 reads the contents of the PHY status change registers 116 to identify the particular register whose contents are "1", thereby identifying the particular link(s) whose status has changed. Next, the host CPU 32 reads the contents of the port IRC control registers 114 that may be in the same trunk as the recovered link to determine whether the recovered link is part of a trunk and which other port(s) are active links in the same trunk.

In an alternative configuration, the host CPU 32 may bypass reading the port IRC control registers 114 to determine which other port(s) may be active link in the same trunk as the recovered link by saving the trunking information in host CPU 32 memory at setup time. Advantageously, retrieving the trunking information from host CPU 32 memory is faster than reading the trunking information from the port IRC control registers 114.

Next, assume that the link associated with port 2 recovers to proper operating conditions. In this scenario, the host CPU 32 reads the contents of PHY status change registers 116 and determines the contents of register 116b to be "1". The host CPU 32 is then aware that the link associated with port 2 has been restored. Next, the host CPU 32 determines whether port 2 is an inactive link of trunk 1, i.e., trunk is "1" and trunk_act is "0".

For example, assume that port 2 is an inactive part of trunk 1. The host CPU 32 then determines the other active port(s) in the trunk, either by reading the contents of the other port IRC control registers 114 that correspond to ports that may be in trunk 1, i.e., 114a, 114c and 114d in the exemplary trunking configuration illustrated in FIG. 10 or by accessing host CPU 32 memory. Next, at step 408, the host CPU 32 clears the trunk_act bits in the respective port IRC control registers 114 that correspond to active ports in the trunk.

For example, assume the host CPU 32, at step 406, determined that ports 1 and 3 were active ports in trunk 1 when the link from port 2 returned to proper working conditions. In this scenario, the host CPU 32 clears the trunk_act bits in port IRC control registers 114a and 114c, corresponding to ports 1 and 3. This prevents the IRC 40 from forwarding frames to these ports while the output queues are being processed, as discussed below.

Next, at step 410, the host CPU 32 sets the en_tx bit in the respective PMCR 118 that corresponds to the trunk port that has recovered to proper operation conditions. In the example above, the host CPU 32 sets the en_tx bit in PMCR 118b, corresponding to port 2.

The switch subsystem 42, at step 412, then effectively flushes or discards all data frames queued for transmission from the active ports. In the exemplary embodiment of the present invention, the switch subsystem "transmits" all data frames queued for transmission from the active trunk ports, with the transmitter turned off. In other words, the switch subsystem 42 processes the frames in the normal manner with the the frames will not be delivered to the destination and hence will not be delivered out of order. In an alternative embodiment, the switch subsystem 42 flushes all data frames queued for transmission from the active trunk ports by dropping the frame pointers from the corresponding output queues 58, thereby ensuring that frames are not delivered out of order.

The host CPU 32, at step 414, then checks whether the output queues, for both the high and low priority frames associated with the ports in the trunk that were active when the link recovery was detected, are empty. The host CPU 32 accomplishes this by reading the contents of the output queue count registers associated with the appropriate ports.

When the host CPU 32 determines that the queues are empty, the host CPU 32 reactivates the trunk at step 416. To accomplish this, the host CPU 32 sets the trunk_act bits in the port IRC control registers 114 which correspond to the links which will be included in the active trunk.

For example, in the scenario described above in which port 2 experienced a link recovery and ports 1 and 3 were active links in the trunk, the host CPU 32 sets the trunk_act bit in registers 114a, 114b and 114c to "1", corresponding to properly working links associated with ports 1, 2 and 3. In this manner, trunk 1 is reconfigured to include ports 1, 2 and 3 as active links and ports 1–3 are then usable to transmit data via trunk 1 to its destination.

In the manner described above, the multiport switch 12 is advantageously able to reconfigure a trunk after a link recovery occurs in a quick and efficient manner without reprogramming the address table, thereby reducing potential network downtime. The multiport switch 12 is also able to ensure that frames are not transmitted out of order while the host CPU 32 is reconfiguring the trunk to include the restored link.

Described has been a system and method for handling link failure and link recovery in a trunked data path. An advantage of the invention is that both link failure and link recovery are handled in an efficient manner with little additional processing overhead. Another advantage of the invention is that both the link failure and link recovery are handled without reprogramming the address table, thereby avoiding time-consuming and costly network downtime.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A multiport switch configured for controlling communication of data frames between stations and to support trunking, comprising:
   a memory device configured to store trunking information associated with ports on the multiport switch, wherein a plurality of ports comprise active ports of a first trunk based on the trunking information, wherein
   the trunking information includes information as to whether each said ports is part of a trunk, and if part of a trunk, information as to whether said each said ports is an active port or inactive port of the trunk, and
   data transmission capability from each of the plurality of ports in the first trunk is set based on a link status associated with the corresponding port.

2. The multiport switch of claim 1, further comprising:
   a link status indicator configured to store the link status associated with said each said ports on the multiport switch.

3. The multiport switch of claim 2, further comprising:
   a plurality of configuration registers corresponding to said each said ports on the multiport switch, each of the configuration registers configured to store data transmission information indicating whether transmission is enabled for the respective port.

4. The multiport switch of claim 3, wherein data transmission is disabled for a first port of the active ports in the first trunk, based on the stored link status indicating that a change occurred-in a link associated with the first port and the change represents a link failure.

5. The multiport switch of claim 3, wherein data transmission is enabled for an inactive port in the first trunk based on the stored link status indicating that a change occurred in a link associated with the inactive port and the change represents a link recovery.

6. The multiport switch of claim 1, comprising:
   a plurality of output queues corresponding to ports on the multiport switch, each of the output queues configured to store information associated with data frames queued for transmission from the respective port,
   wherein data frames queued for transmission from a first port in the first trunk are discarded when a link failure associated with the first port is detected.

7. The multiport switch of claim 1, wherein the trunking information comprises:
   a trunk bit for indicating whether a port is a part of a trunk; and
   a trunk active bit for indicating whether the port is an active part of a trunk.

8. In a multiport switch that controls communication of data frames between stations and is configured to support trunking, a method of handling changes in a trunked data path, comprising:
   storing trunking information associated with ports on the multiport switch, the trunking information including information as to whether each said ports is part of a trunk, and if part of a trunk, information as to whether said each said ports is an active port or inactive port of the trunk,
   receiving a data frame;
   generating data forwarding information for the data frame;
   monitoring link status associated with the respective ports on the multiport switch, wherein a plurality of ports comprise active ports of a first trunk; and
   setting data transmission capability for each of the plurality of ports in the first trunk based on the link status associated with the corresponding port.

9. The method of claim 8, comprising:
   detecting a change in link status associated with a first port in the first trunk, wherein the change represents a link failure; and
   disabling transmission capability from the first port, in response to the detected change in link status.

10. The method of claim 9, comprising:
    reconfiguring the first trunk to exclude the first port as an active port of the first trunk.

11. The method of claim 10, comprising:
    discarding frames queued for transmission from said first port.

12. The method of claim 8, comprising:
    detecting a change in link status associated with a first port in the first trunk, wherein the first port is an inactive port of the first trunk and the change represents a link recovery; and
    enabling transmission capability through the first port and activating the first port, in response to the detected change in link status of the first port.

13. A multiport switch configured for controlling communication of data frames between stations and to support trunking, comprising:
    a table for storing address information and data forwarding information;
    a decision making engine configured to search the table and generate data forwarding information for a data frame;
    a plurality of programmable registers corresponding to ports on the multiport switch, each of the programmable registers configured to store trunking information for one of the respective ports, wherein
       the trunking information includes information as to whether each said ports is part of a trunk, and if part of a trunk, information as to whether said each said port is an active port or inactive port of the trunk, and
       a plurality of ports comprise active ports of a first trunk based on the trunking information; and
    a link status indicator configured to store a link status associated with each of the respective ports on the multiport switch, wherein data transmission capability from each of the plurality of ports in the first trunk is set based on the link status associated with the corresponding port.

14. The multiport switch of claim 13, comprising:

a plurality of configuration registers corresponding to said each said ports on the multiport switch, each of the configuration registers configured to store data transmission information indicating whether transmission is enabled for the respective port.

15. The multiport switch of claim 14, wherein data transmission is disabled for a first port in the first trunk, based on a change in the link status associated with the first port, wherein the change represents a link failure.

16. The multiport switch of claim 14, wherein data transmission is enabled for an inactive port in the first trunk, based on a change in the link status associated with the inactive port, wherein the change represents a link recovery.

17. The multiport switch of claim 13, wherein the link status indicator comprises:

a plurality. of link status registers corresponding to said each said ports on the multiport switch, each of the link status registers configured to store information indicating whether a link status has changed.

18. The multiport switch of claim 17, comprising:

an OR gate coupled to each of the link status registers, wherein the output of the OR gate is transmitted to a control device to signal that a link status has changed.

19. The multiport switch of claim 13, comprising:

a plurality of output queues corresponding to said each said ports on the multiport switch, each of the output queues configured to store pointer information associated with data frames queued for transmission from the respective port, wherein data frames queued for transmission from the first port in the first trunk are discarded when a link failure associated with the first port is detected.

* * * * *